United States Patent
Bell et al.

(10) Patent No.: US 9,472,209 B2
(45) Date of Patent: *Oct. 18, 2016

(54) DEEP TAGGING BACKGROUND NOISES

(71) Applicant: International Business Machines Corporation, Armonk, NY (US)

(72) Inventors: Denise A. Bell, Austin, TX (US); Lisa Seacat DeLuca, Baltimore, MD (US); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,829

(22) Filed: Jan. 5, 2016

(65) Prior Publication Data

US 2016/0118063 A1 Apr. 28, 2016

Related U.S. Application Data

(63) Continuation of application No. 13/630,401, filed on Sep. 28, 2012, now Pat. No. 9,263,059.

(51) Int. Cl.
*G10L 15/20* (2006.01)
*G10L 19/018* (2013.01)
*G10L 25/78* (2013.01)
*G10L 25/84* (2013.01)
*G10L 25/54* (2013.01)

(52) U.S. Cl.
CPC .............. *G10L 25/84* (2013.01); *G10L 15/20* (2013.01); *G10L 19/018* (2013.01); *G10L 25/54* (2013.01); *G10L 25/78* (2013.01)

(58) Field of Classification Search
CPC ... G10L 25/78; G10L 21/06; G10L 21/0208; G10L 25/54; G10L 25/84; G10L 25/51
See application file for complete search history.

(56) References Cited

U.S. PATENT DOCUMENTS

| 4,926,484 A | 5/1990 | Nakano |
| 5,764,852 A | 6/1998 | Williams |
| 6,882,974 B2 | 4/2005 | James et al. |

(Continued)

FOREIGN PATENT DOCUMENTS

| CN | 1655234 B | 1/2012 |
| EP | 0327266 A2 | 8/1989 |

OTHER PUBLICATIONS

Arrington, "All the Cool Kids Are Deep Tagging | TechCrunch", Oct. 1, 2006 [online], [retrieved on Jul. 19, 2012]. Retrieved from the Internet <URL: http://techcrunch.com/2006/10/01/all-the-cool-kids-are-deep-tagging/>.

(Continued)

*Primary Examiner* — Matthew Baker
(74) *Attorney, Agent, or Firm* — Jason H. Sosa; William H. Hartwell

(57) ABSTRACT

In a method for deep tagging a recording, a computer records audio comprising speech from one or more people. The computer detects a non-speech sound within the audio. The computer determines that the non-speech sound corresponds to a type of sound, and in response, associates a descriptive term with a time of occurrence of the non-speech sound within the recorded audio to form a searchable tag. The computer stores the searchable tag as metadata of the recorded audio.

25 Claims, 5 Drawing Sheets

(56) References Cited

U.S. PATENT DOCUMENTS

| | | |
|---|---|---|
| 7,995,732 B2 | 8/2011 | Koch et al. |
| 8,180,634 B2 | 5/2012 | Fallat et al. |
| 8,370,142 B2 | 2/2013 | Frankel et al. |
| 8,654,951 B1 | 2/2014 | Olmsted et al. |
| 8,767,922 B2 | 7/2014 | Kanevsky et al. |
| 8,812,510 B2 | 8/2014 | Romanov et al. |
| 8,937,888 B2 | 1/2015 | Foo et al. |
| 2004/0236830 A1 | 11/2004 | Nelson et al. |
| 2004/0249884 A1 | 12/2004 | Caspi et al. |
| 2006/0116873 A1 | 6/2006 | Hetherington et al. |
| 2007/0047718 A1 | 3/2007 | Idler et al. |
| 2009/0094029 A1 | 4/2009 | Koch et al. |
| 2010/0031146 A1 | 2/2010 | Finkelstein et al. |
| 2010/0063815 A1 | 3/2010 | Cloran et al. |
| 2010/0063880 A1 | 3/2010 | Atsmon et al. |
| 2010/0158237 A1 | 6/2010 | McCormack et al. |
| 2010/0169786 A1 | 7/2010 | O'Brien et al. |
| 2010/0299131 A1 | 11/2010 | Lanham et al. |
| 2011/0225247 A1 | 9/2011 | Anantharaman et al. |
| 2011/0228921 A1 | 9/2011 | Singh et al. |
| 2011/0243123 A1 | 10/2011 | Munoz-Bustamante et al. |
| 2012/0014514 A1 | 1/2012 | Enbom et al. |
| 2012/0022863 A1 | 1/2012 | Cho et al. |
| 2012/0072845 A1 | 3/2012 | John et al. |
| 2012/0166188 A1 | 6/2012 | Chakra et al. |
| 2012/0221330 A1 | 8/2012 | Thambiratnam et al. |
| 2012/0269333 A1 | 10/2012 | Goguen et al. |
| 2012/0296914 A1 | 11/2012 | Romanov et al. |
| 2012/0321062 A1 | 12/2012 | Fitzsimmons et al. |
| 2013/0163781 A1 | 6/2013 | Thyssen et al. |
| 2013/0259211 A1 | 10/2013 | Vlack et al. |
| 2014/0095166 A1 | 4/2014 | Bell et al. |
| 2014/0105407 A1 | 4/2014 | Herger et al. |
| 2014/0270114 A1 | 9/2014 | Kolbegger et al. |

OTHER PUBLICATIONS

Casey, "MPEG-7 Sound Recognition Tools", [online], [retrieved on Jul. 19, 2012]. Retrieved from the Internet <URL: http://doc.gold.ac.uk/~mas01mc/CASEY_IEEE_CVST.pdf>.

EPTASCAPE, "Eptascape, Inc. Unattended object detection at a train station", Copyright 2010 [online], [retrieved on Jul. 21, 2012]. Retrieved from the Internet <URL:http://www.eptascape.com/products/UnObjTrain/UnObjectTrainStation.html>.

Schuller et al., "Static and Dynamic Modelling for the Recognition of Non-verbal Vocalisations in Conversational Speech", Institute for Human-Machine Communication, PIT 2008, LNCS 5078, pp. 99-110, 2008, Copyright Springer-Verlag Berlin Heidelberg 2008.

Wikipedia, "MPEG-7", Published on: Apr. 12, 2012, Wikipedia, the free encyclopedia [online], [retrieved on Jul. 21, 2012]. Retrieved from the Internet <URL: http://en.wikipedia.org/wiki/MPEG-7>.

Clavel et al., "Events detection for an audio-based surveillance system", IEEE International Conference on Multimedia and Expo, 6-6 Jul. 2005, pp. 1306-1309.

DEEP TAGGING BACKGROUND NOISES

TECHNICAL FIELD

The present invention relates generally to the field of content searching, and more particularly, to locating desired content within recorded audio and/or audio-visual content.

BACKGROUND

Tagging is the process of associating a descriptive word or phrase to an entire machine-readable file such as a document, file, video, sound clip, article, or web page. Such descriptive words or phrases, or "tags," allow separate users to glean the subject matter and/or topics covered in the tagged file. More importantly, tagging allows users to use a search engine to search for the tagged file, and may provide a link to the file. Deep tagging is the process of tagging within one or more portions of a machine-readable file. For example, in a video or audio file that is large and contains many different subjects, deep tagging may provide a descriptive word association to a specific portion of the file. A search or selection of such a tag word may provide a link directly to the specific portion of the video or audio file. Additionally, from such a tag, a URL can be generated. The tags may then be searchable and indexable by search engines, and online users can be led directly to the specific portion of the video or audio file on a website.

SUMMARY

One embodiment of the present invention includes a method for deep tagging a recording. A computer records audio comprising speech from one or more people. The computer detects a non-speech sound within the audio. The computer determines that the non-speech sound corresponds to a type of sound, and in response, associates a descriptive term with a time of occurrence of the non-speech sound within the recorded audio to form a searchable tag. The computer stores the searchable tag as metadata of the recorded audio.

A second embodiment of the present invention includes a computer program product for deep tagging a recording. The computer program product includes one or more computer-readable storage media and program instructions stored on at least one of the one or more computer-readable storage media. The program instructions include: program instructions to record audio comprising speech from one or more people; program instructions to detect a non-speech sound within the audio; program instructions to determine that the non-speech sound corresponds to a type of sound, and in response, to associate a descriptive term with a time of occurrence of the non-speech sound within the recorded audio to form a searchable tag; and program instructions to store the searchable tag as metadata of the recorded audio.

A third embodiment of the present invention includes a system for deep tagging a recording. The system includes one or more computer processors, one or more computer-readable storage media, and program instructions stored on at least one of the one or more computer-readable storage media for execution by at least one of the one or more computer processors. The program instructions include: program instructions to record audio comprising speech from one or more people; program instructions to detect a non-speech sound within the audio; program instructions to determine that the non-speech sound corresponds to a type of sound, and in response, to associate a descriptive term with a time of occurrence of the non-speech sound within the recorded audio to form a searchable tag; and program instructions to store the searchable tag as metadata of the recorded audio.

A fourth embodiment of the present invention includes a method for playing a recording. A computer receives a descriptive term or phrase associated with a searchable tag, wherein the searchable tag corresponds to a point-in-time at which a non-speech sound occurred during the recording of recorded content. The computer navigates to a location in the recorded content corresponding to the point-in-time at which the non-speech sound occurred. The computer plays at least a portion of the recorded content starting at the point-in-time.

DETAILED DESCRIPTION

Figure 1:
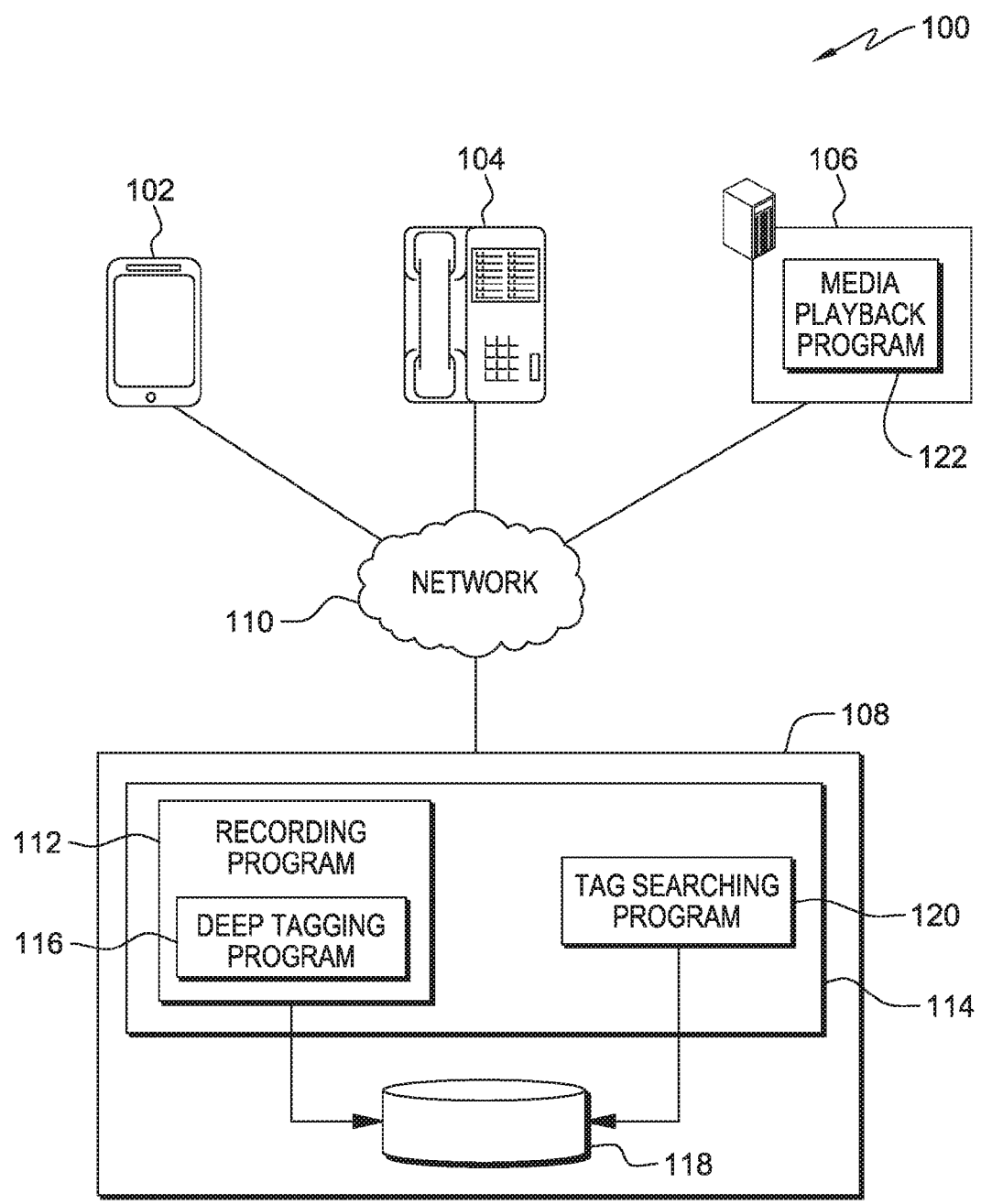
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. Distributed data processing environment 100 depicts communication devices 102, 104, and 106, and computer 108 interconnected by network 110. Computer 108 may be a server computer, workstation, laptop computer, netbook computer, a desktop computer, or any programmable electronic device capable of receiving audio or video content from any of communication devices 102, 104, and 106. For the purposes of this disclosure, video content may also include audio content. Communications devices 102, 104, and 106 may each respectively be a telephone, smart phone, network phone, a computing system, or any other device capable of sending audio or video content to computer 108.

Network 110 may include connections such as wiring, wireless communication links, fiber optic cables, and any other communication medium. In general, network 110 can be any combination of connections and protocols that will support communications between computer 108 and communication devices 102, 104, and 106.

Recording program 112 resides on computer 108 and records streaming content from one or more of communications devices 102, 104, and 106. Recording program 112 may be a function of a larger program such as conferencing program 114. Conferencing program 114 may host audio or video conferences, allowing disparate users from communications devices 102, 104, and 106 to interact with one another while being geographically separate. Recording program 112 may combine one or more streams of audio or video content from communications devices 102, 104, and 106 into a single file of recorded content.

Deep tagging program 116 allows for and may provide tags, within the recorded content, corresponding to specific segments or points-in-time of the recorded content. Embodiments of the present invention recognize that listeners or viewers of content, such as participants in a teleconference, may subsequently remember a specific point in the content, such as a point in a teleconference conversation, based on the occurrence of a non-speech sound. For example, the sound of laughter, or the sound of a barking dog, or the sound of a sneeze may stand out in a participant's mind and act as a subsequent memory cue to a specific point in the conversation. Deep tagging program 116 provides a method for identifying and tagging such non-speech sounds for subsequent search and playback.

Recording program 112 may store recorded content (as a file) in database 118. Deep tagging program 116 may store tags identifying non-speech sounds in database 118 as metadata of the stored file. The stored tags may each correspond to a different specific point-in-time location in the recorded content. Tag searching program 120, which may also be a sub-program of conferencing program 114, can subsequently access files of database 118, in response to a user query, to locate the recorded content using a tag generated by deep tagging program 116 and return the file, or a link to the file, with the tag and/or an indication of the point-in-time associated with the tag.

Persons of ordinary skill in the art will understand that, in various embodiments, the functionality of deep tagging program 116 may be independent of an encompassing recording or conferencing program, such as conferencing program 114, and may operate on recorded audio or video content irrespective of the content's source.

Media playback program 122 resides on communications device 106 and provides the functionality to play an audio or video file from the point-in-time associated with a deep tag.

Exemplary internal and external hardware components for a data processing system, which can serve as an embodiment of computer 108 and an embodiment of communications device 106, are depicted and described in further detail with reference to FIG. 5.

Figure 2:
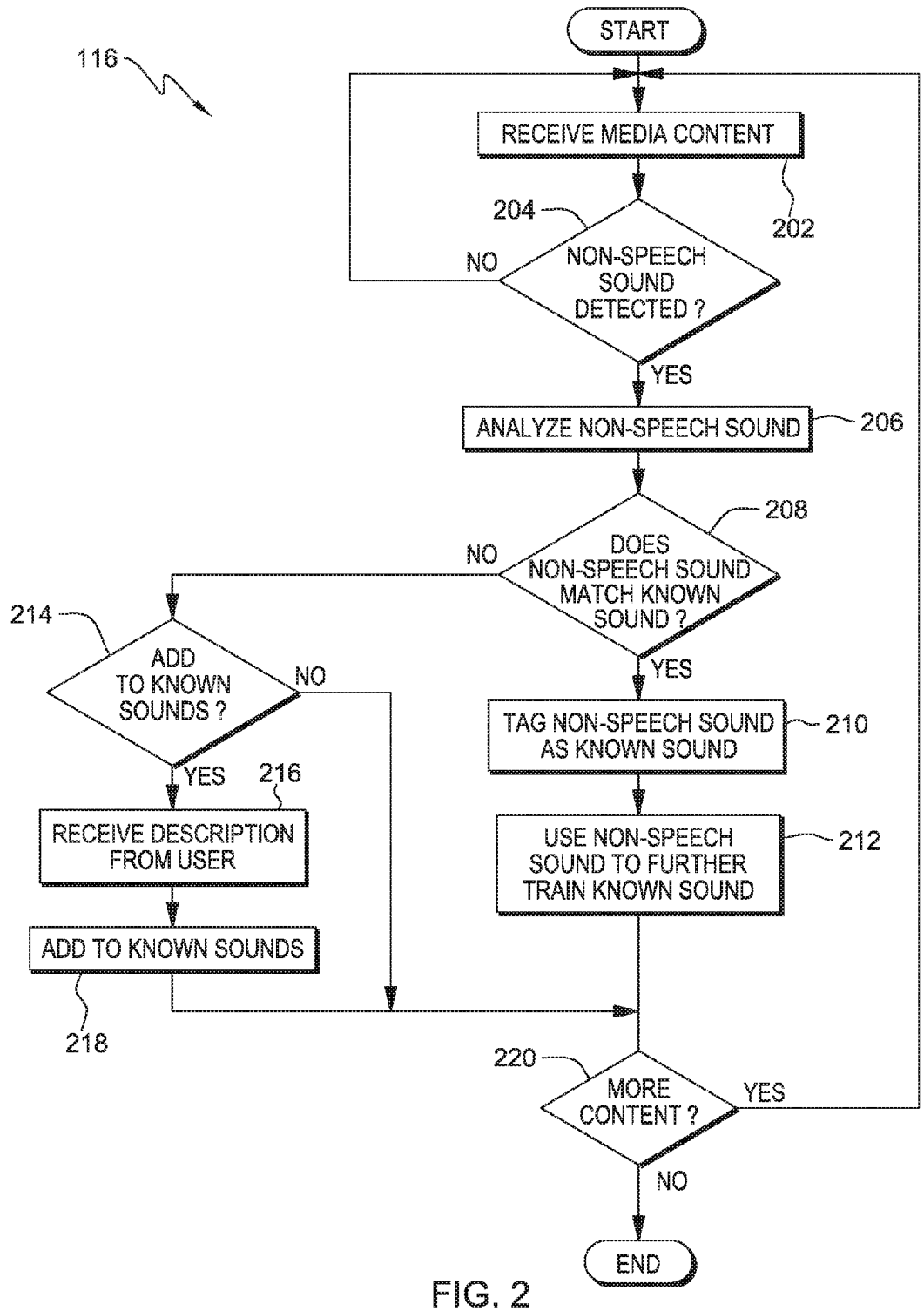
FIG. 2 is a flowchart depicting operational steps of a deep tagging program for deep tagging non-speech sounds in recorded audio or video content, in accordance with an embodiment of the present invention.

FIG. 2 is a flowchart depicting operational steps of deep tagging program 116 for deep tagging non-speech sounds in recorded audio or video content, in accordance with an embodiment of the present invention.

Deep tagging program 116 receives media content (step 202) from one or more devices communicatively coupled to computer 108. As used herein, "media content" refers to audio or video content. The media content may comprise one or more separate content streams received substantially in parallel. In one embodiment, the media content may be a conversation that is being recorded. The separate content streams may be live audio or video received from geographically diverse communication devices, with each separate stream corresponding to the same conversation. In another embodiment, deep tagging program 116 may receive the media content in the form of a prerecorded file. In the case where a segment of content having a size greater than a pre-defined threshold is received, deep tagging program 116 may break the segment into smaller segments for analysis.

As the media content is received, deep tagging program 116 detects whether a non-speech sound has occurred (decision 204). In one embodiment, deep tagging program 116 detects that a non-speech sound has occurred by receiving an indication from a user of such a sound. For example, during the course of a teleconference, any participant (or potentially a moderator) may select a certain option or press a specific key sequence indicating that such a sound has occurred. Computer 108 receives the indication and marks that point-in-time, or just before that point-in-time, as one in which a non-speech sound occurred.

In another embodiment, as an alternative to, or in addition to, receiving an indication from a user of a non-speech sound, deep tagging program 116 may detect deviations from normal speech patterns. As an example, deep tagging program 116 may utilize a spectrogram created for the media content. As time goes on, an average frequency or frequencies may be calculated for sounds in the media content. If in utilizing the spectrogram, deep tagging program 116 determines that a frequency exceeds an upper threshold above the average, or falls below a lower threshold below the average, deep tagging program 116 may mark the point-in-time corresponding to the deviation as one in which a non-speech sound occurred. In an embodiment, in utilizing the spectrogram, deep tagging program may also detect an absence or a sudden absence of sound, which may be equally valuable as detecting a non-speech sound. Though described as being applied to a single stream of media content, persons of ordinary skill in the art will recognize that the above described embodiments for detecting non-speech sounds may also be applied to separate streams of sound received from separate devices prior to the streams being combined into a single media file. In such a manner, deep tagging program 116 may effectively determine the device from which the non-speech sound originated.

In another embodiment, deep tagging program 116 may use computational auditory scene analysis (CASA) models, which rely on various signal processing techniques and "grouping" heuristics, to divide a sound signal into parts arising from independent sources. "Sources" in this context refers to the actual sound source (e.g., a bird, a dog, a specific individual) and not the device from which the sound was received. In one implementation, deep tagging program 116 may employ a filter-bank to break the received signal/sound into different frequency bands. The frequency bands may be organized into discrete elements such as "tracks," corresponding to harmonic partials, and "onsets," representing abrupt rises in energy that may correspond to the start of a new sound. Deep tagging program 116 may then group these discrete elements according to source. For example, tracks with simple frequency relationships may form a group corresponding to a harmonic sound. Deep tagging program 116 may use the length of the sound in each group in conjunction with speech recognition algorithms to determine whether a sound is a speech sound or a non-speech sound.

In one embodiment, at the detection of a non-speech sound, deep tagging program 116 can tag the non-speech sound without further processing. For example, deep tagging program 116 may tag the non-speech sound within the recorded file with the tag "non-speech sound." Deep tagging program 116 can also tag the non-speech sound with additional tags, which might include an identifier of a participant corresponding to the device from which the non-speech sound originated. The identifier could include, in a non-exhaustive list, a name, email address, or phone number. Where the non-speech sound is the ceasing of a previously occurring sound, the non-speech sound may be tagged as "break in background noise" or something similarly descriptive.

In a preferred embodiment, subsequent to the detection of a non-speech sound, deep tagging program 116 may further analyze the detected non-speech sound (step 206) to determine if the non-speech sound should be tagged. In one embodiment, if the non-speech sound has not already been separated from other distinct sound objects/sources, deep tagging program 116 may separate the non-speech sound from other distinct sound objects/sources in step 206 as described previously. It is noted, however, that though separated sounds might make subsequent comparisons to known sounds more accurate, comparisons to known sounds can be made without such separation. It is also in step 206 that deep tagging program 116 may begin comparing the non-speech sound to a library of known sounds.

Deep tagging program 116 determines whether the non-speech sound matches a known sound (decision 208). In general, deep tagging program 116 compares features of the non-speech sound, as depicted in a spectrogram for example, to features of stored sounds. In a preferred embodiment, each of the stored sounds has been specified by a user, administrator, or participant, as a sound to be tagged within a recording. Specifically, prior to deep tagging program 116 deep tagging a recording, a user may enter a sound he or she wishes deep tagging program 116 to determine as being a non-speech sound, and will preferably provide examples of the non-speech sound. Deep tagging program 116 can measure features of a representation of the non-speech sound. Deep tagging program 116 may employ a classification function (which may be learned during a training period) to place the non-speech sound in a class of known sound. In one implementation, a class of sound may be specified by providing a number of examples. Deep tagging program 116 may use a feature vector made up of perceptually motivated acoustic properties (for example, correlates of loudness, pitch, brightness, bandwidth, and harmonicity, as well as variation over time) to form a Gaussian model of the sound class. Deep tagging program 116 may use the relative ranges of the various features, and also inter-feature correlation, to identify similar sound examples. Deep tagging program 116 may consider the non-speech sound not to match any known sounds if a specified threshold confidence level is not reached.

If the non-speech sound matches a known sound (yes branch, decision 208), deep tagging program 116 deep tags the non-speech sound within the recording with one or more words descriptive of the known sound (step 210). In a preferred embodiment, each known sound (in one embodiment identified as a sound class) has a plurality of descriptive terms and categories mapped to the sound, and deep tagging program 116 may deep tag the non-speech sound within the recording with one or more of these terms. Descriptive terms may also include phonetic spellings of the sounds (e.g., "bark," "ruff," "chirp, chirp," etc.). Deep tagging program 116 may additionally deep tag the non-speech sound with a participant identifier. Deep tagging program 116 may also add the non-speech sound to a list of examples for the known sound to further train deep tagging program 116 (step 212).

In the case that the non-speech sound does not match a known sound (no branch, decision 208), deep tagging program 116 may determine whether to add the non-speech sound as a new known sound, or class of sound, to the database (decision 214). For example, deep tagging program 116 may query all the participants, or alternatively the participant whose device the non-speech sound was received from, to potentially identify the non-speech sound. For example, deep tagging program 116 may display a message reading: "A distinct noise has been identified as originating at your location. Would you like to identify that noise?" If deep tagging program 116 determines that the non-speech sound will be added to the known sounds (yes branch, decision 214), deep tagging program 116 receives a description of the non-speech sound from the user or participant (step 216) and may deep tag the non-speech sound with the description. Deep tagging program 116 may then add the non-speech sound to a library of known sounds (step 218) and may map the non-speech sound to the received description. Persons of ordinary skill in the art will recognize that in an embodiment of the present invention, deep tagging program 116 may be devoid of matching algorithms and may always resort to querying a user or participant to identify and deep tag an identified non-speech sound.

Subsequent to deep tagging the non-speech sound (in step 212), or determining that an unmatched sound will not be added (no branch, decision 214), or after adding a new sound (in step 218), deep tagging program 116 determines whether more media content is being received for analysis (decision 220) and repeats the process on such content.

Figure 3:
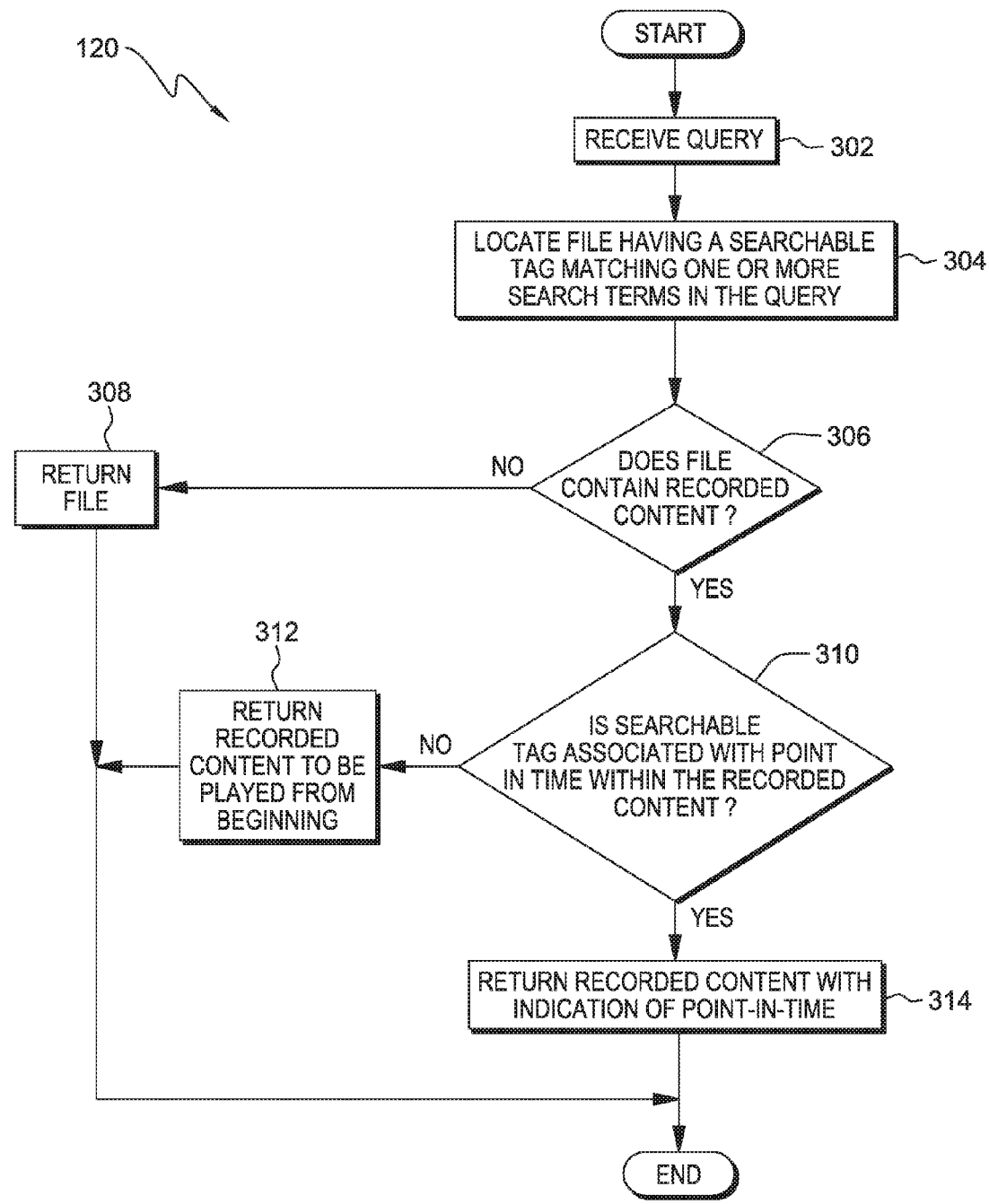
FIG. 3 is a flowchart depicting operational steps of a tag searching program for locating deep tags within recorded audio or video content, in accordance with an embodiment of the present invention.

FIG. 3 is a flowchart depicting operational steps of tag searching program 120 for locating deep tags within recorded audio or video content, in accordance with an embodiment of the present invention.

Tag searching program 120 receives a query (step 302) including one or more search terms. The query may be received from a device, such as computer 108 or any device in communication with computer 108. Tag searching program 120 locates a file having a searchable tag matching one or more search terms in the query (step 304). In one embodiment, tag searching program 120 searches metadata of recorded files for tags, and compares each located tag to a search term given in the query. In another embodiment, tag searching program 120 identifies a search term as a descriptive term mapped to a known sound. Subsequently, tag searching program 120 may search for all descriptive terms mapped to the known sound in file metadata.

Tag searching program 120 determines whether the file contains recorded media content (decision 306). Many types of content are capable of having descriptive tags associated with them. If the located file does not contain recorded media content, such as audio or video content, (no branch, decision 306), tag searching program 120 returns the file, or a hyperlink to the file, to the device (step 308). If the file does contain recorded media content (yes branch, decision 306), tag searching program 120 determines whether the matching searchable tag is associated with the file in general or with a specific point-in-time within the recorded media content (decision 310). If the matching searchable tag is a tag generally associated with the file (no branch, decision 310), then tag searching program 120 returns the recorded media content, or a hyperlink to the recorded media content, to computer 108, where the recorded media content can played from the beginning (step 312). If the searchable tag is associated with a point-in-time within the recorded media content, i.e., a deep tag (yes branch, decision 310), tag searching program 120 returns, to the device, the recorded media content with an indication of point-in-time associated with the searchable tag, or, alternatively, returns, to the device, a link to the location in the file corresponding to the point-in-time (step 314).

Figure 4:
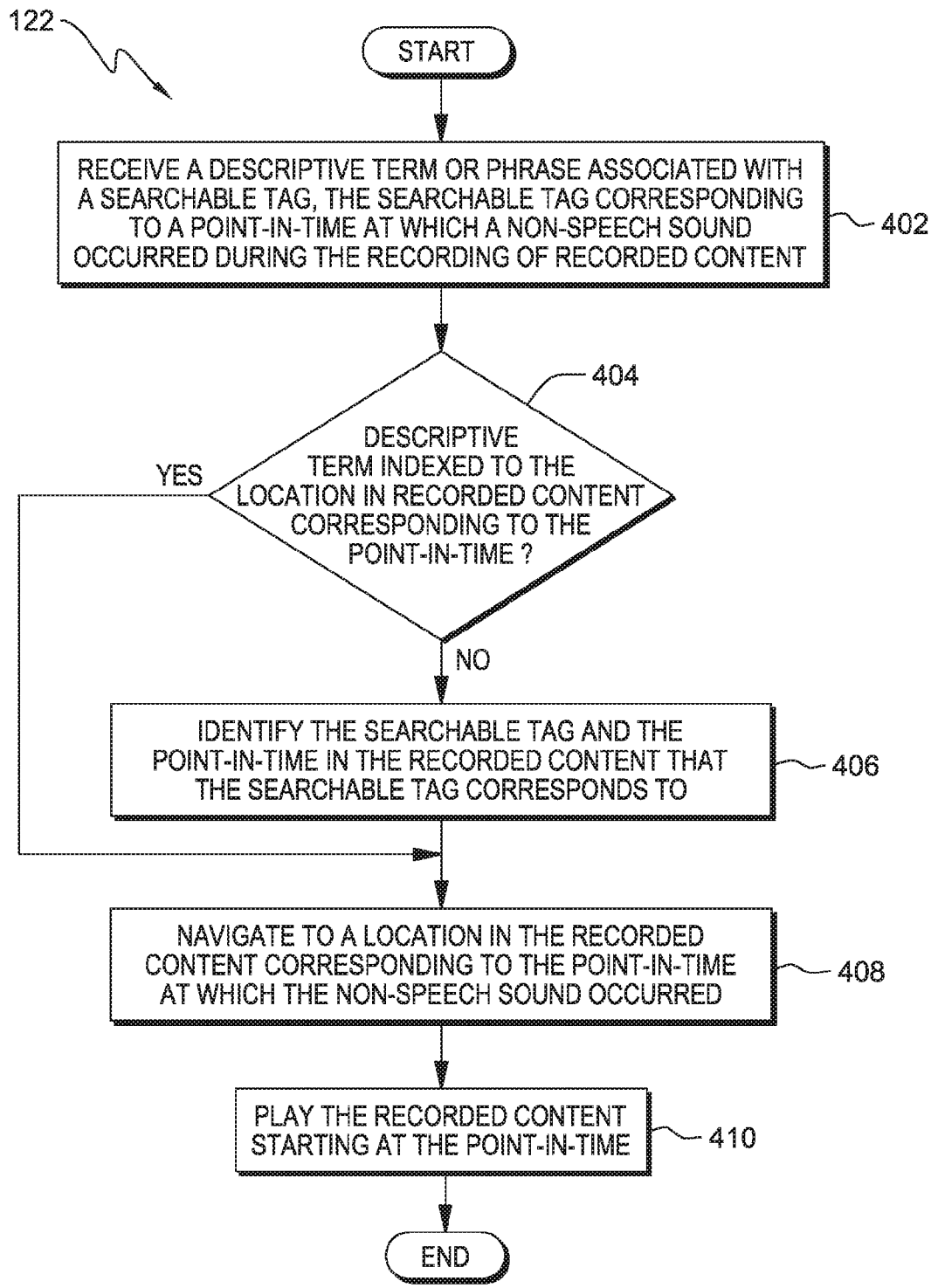
FIG. 4 is a flowchart depicting operational steps of a media playback program for playing recorded audio from a point in time corresponding to a deep tag, in accordance with an embodiment of the present invention.

FIG. 4 is a flowchart depicting operational steps of media playback program 122 for playing recorded audio from a point in time corresponding to a deep tag, in accordance with an embodiment of the present invention.

Media playback program 122 receives a descriptive term or phrase associated with a searchable tag, the searchable tag corresponding to a point-in-time at which a non-speech sound occurred during the recording of recorded content (step 402). For example, media playback program 122 may search metadata of an audio or video file and display a list of discovered deep tags. A user may subsequently select one of the displayed tags, and media playback program 122 may receive a descriptive term or phrase included in the one of the displayed tags. In another embodiment, media playback program 122 may display a list of popular descriptive terms or recently searched for descriptive terms. In yet another embodiment, a user may enter one or more descriptive terms as a search query.

Media playback program 122 determines whether the received descriptive term provides a reference to a location in the recorded content corresponding to the point in time (decision 404). For example, a displayed term might provide a link or location information to media playback program 122, allowing media playback program 122 to "jump" or navigate directly to the point-in-time of the non-speech sound associated with the searchable tag (step 408).

If the descriptive term is not indexed to a location in the recorded content (no branch, decision 404), media playback program 122 identifies the searchable tag associated with the descriptive term or phrase and the point-in-time in the recorded content to which the searchable tag corresponds (step 406). For example, if media playback program 122 previously received the descriptive term in a search query, media playback program 122 may search the recorded content for a searchable tag matching the descriptive term. Subsequent to identifying the searchable tag, media playback program 122 navigates to the location in the recorded content corresponding to the point-in-time at which the non-speech sound occurred (step 408).

After navigating to the proper location, media playback program 122 plays the recorded content starting at the point-in-time at which the non-speech sound occurred (step 410).

Figure 5:
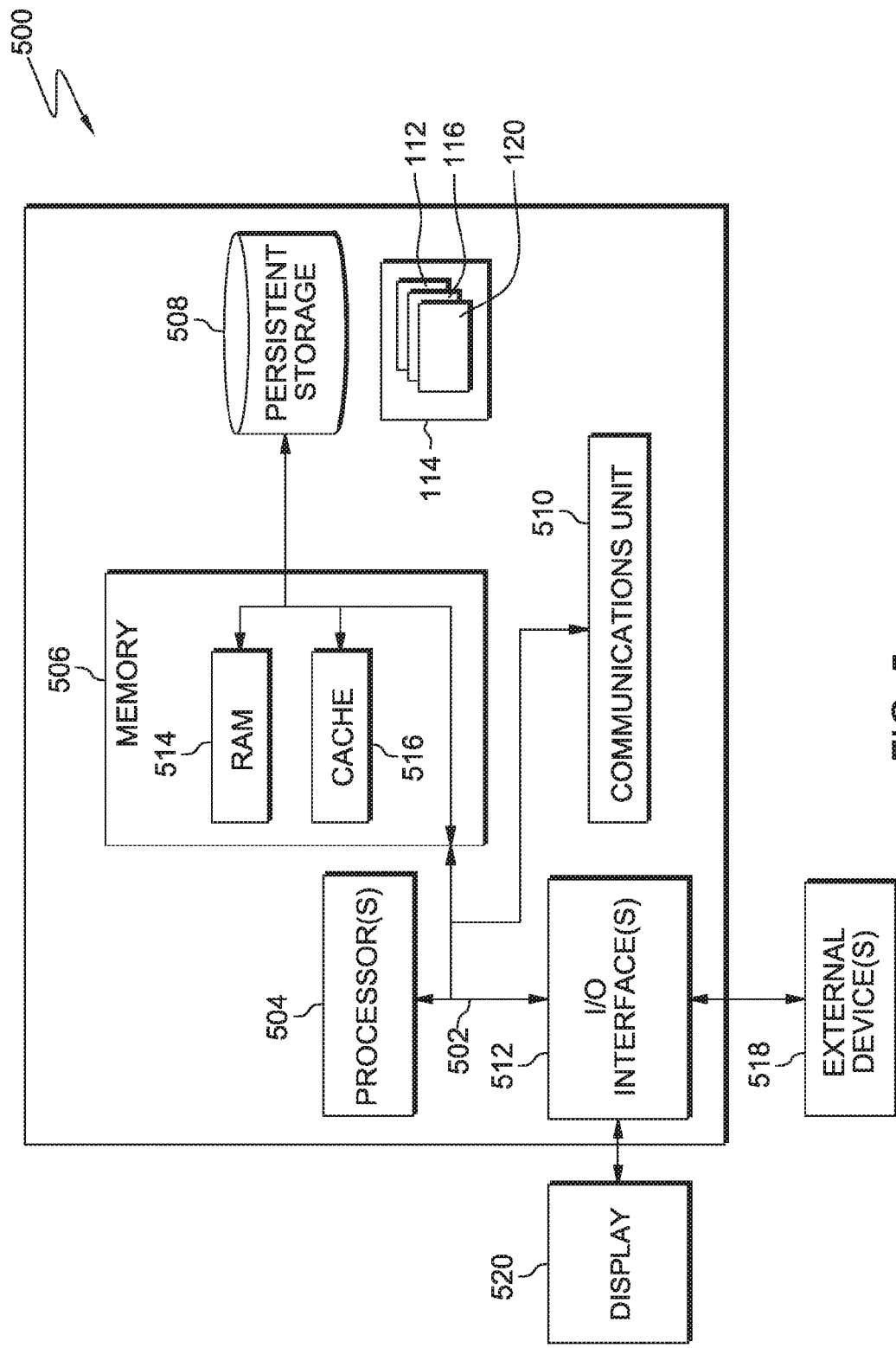
FIG. 5 depicts a block diagram of components of a computer operating within distributed data processing environment of FIG. 1.

FIG. 5 depicts a block diagram of components of data processing system 500, in accordance with an illustrative embodiment of the present invention. In the depicted embodiment, data processing system 500 is representative of components of computer 108. It should be appreciated that FIG. 5 provides only an illustration of one implementation and does not imply any limitations with regard to the environments in which different embodiments may be implemented. Many modifications to the depicted environment may be made.

Data processing system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage medium.

Conferencing program 114, recording program 112, deep tagging program 116, tag searching program 120, and database 118 are stored in persistent storage 508 for execution and/or access by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including communications devices 102, 104, and 106. In these examples, communications unit 510 includes one or more network interface cards. Communications unit 510 may provide communications through the use of either or both physical and wireless communications links. Computer programs and processes may be downloaded to persistent storage 508 through communications unit 510.

I/O interface(s) 512 allows for input and output of data with other devices that may be connected to data processing system 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 512. I/O interface(s) 512 may also connect to a display 520.

Display 520 provides a mechanism to display data to a user and may be, for example, a computer monitor.

In another embodiment in which data processing system 500 is representative of components of communications device 106, data processing system 500 is devoid of conferencing program 114, recording program 112, deep tagging program 116, tag searching program 120, and database 118, and instead includes media playback program 122 stored in persistent storage 508 for execution and/or access by one or more of computer processors 504 via one or more memories of memory 506.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for deep tagging a recording, the method comprising the steps of:
   a computer filtering, from recorded audio of a communication between a plurality of participants, wherein the recorded audio comprises speech from one or more of the plurality of participants, a non-speech sound that was transmitted to the plurality of participants;
   the computer automatically determining that the non-speech sound corresponds to a type of sound, and in response, automatically associating a descriptive term with a time of occurrence of the non-speech sound within the recorded audio to form a searchable tag, wherein the descriptive term includes a phonetic translation of the non-speech sound; and
   the computer storing the searchable tag as metadata of the recorded audio.

2. The method of claim 1, wherein the recorded audio is received in a plurality of separate media streams each from a separate electronic device.

3. The method of claim 1, further comprising the computer receiving an input from one or more of the plurality of participants to assist in tagging the non-speech sound.

4. The method of claim 1, wherein the communication is a teleconference.

5. The method of claim 1, wherein the descriptive term comprises an identifier of a user of an electronic device from which the non-speech sound originated.

6. The method of claim 1, wherein the step of automatically associating the descriptive term with the time of the occurrence of the non-speech sound within the recorded audio comprises the computer obtaining the descriptive term from a mapping between the type of sound and one or more descriptive terms.

7. The method of claim 1, further comprising the steps of:
the computer determining that a sound occurring within the recorded audio has ceased at a point in time within the recorded audio; and
the computer creating a searchable tag associated with the point in time within the recorded audio indicating that the sound occurring within the recorded audio has ceased.

8. The method of claim 1, further comprising the steps of:
the computer receiving a search query;
the computer matching the search query to the searchable tag; and
the computer responding to the search query with the recorded audio and an indication of the time of occurrence of the non-speech sound.

9. The method of claim 8, wherein the step of matching the search query to the searchable tag comprises:
the computer identifying a type of sound associated with a search term of the search query;
the computer identifying a plurality of terms associated with the identified type of sound; and
the computer searching the recorded audio for a searchable tag matching a term from the plurality of terms.

10. The method of claim 1, further comprising the steps of:
the computer receiving a search query;
the computer matching the search query to the searchable tag; and
the computer responding to the search query with a link to a location in the recorded audio corresponding to the time of occurrence of the non-speech sound.

11. The method of claim 1, wherein the step of determining that the non-speech sound corresponds to a type of sound, further comprises, the computer determining that the type of sound is in a list of preferences indicating that the type of sound should be tagged.

12. A computer program product for deep tagging a recording, the computer program product comprising:
one or more computer-readable storage media; and
program instructions stored on at least one of the one or more computer-readable storage media, the program instructions comprising:
program instructions to filter, from recorded audio of a communication between a plurality of participants, wherein the recorded audio comprises speech from one or more of the plurality of participants, a non-speech sound that was transmitted to the plurality of participants;
program instructions to automatically determine that the non-speech sound corresponds to a type of sound, and in response, to automatically associate a descriptive term with a time of occurrence of the non-speech sound within the recorded audio to form a searchable tag, wherein the descriptive term includes a phonetic translation of the non-speech sound; and
program instructions to store the searchable tag as metadata of the recorded audio.

13. The computer program product of claim 12, wherein the recorded audio is in plurality of separate media streams received from a plurality of distinct electronic devices.

14. The computer program product of claim 12, further comprising program instructions to receive an input from one or more of the plurality of participants to assist in tagging the non-speech sound.

15. The computer program product of claim 12, wherein the communication is a teleconference.

16. The computer program product of claim 12, wherein the descriptive term comprises an identifier of a user of an electronic device from which the non-speech sound originated.

17. The computer program product of claim 12, wherein the program instructions to automatically associate the descriptive term with the time of the occurrence of the non-speech sound within the recorded audio comprise program instructions to obtain the descriptive term from a mapping between the type of sound and one or more descriptive terms.

18. The computer program product of claim 12, further comprising program instructions, stored on at least one of the one or more computer-readable storage media, to:
determine that a sound occurring within the recorded audio has ceased at a point in time within the recorded audio; and
create a searchable tag associated with the point in time within the recorded audio indicating that the sound occurring within the recorded audio has ceased.

19. A system for deep tagging a recording, the system comprising:
one or more computer processors;
one or more computer-readable storage media;
program instructions stored on at least one of the one or more computer-readable storage media for execution by at least one of the one or more computer processors, the program instructions comprising:
program instructions to filter, from recorded audio of a communication between a plurality of participants, wherein the recorded audio comprises speech from one or more of the plurality of participants, a non-speech sound that was transmitted to the plurality of participants;
program instructions to automatically determine that the non-speech sound corresponds to a type of sound, and in response, to automatically associate a descriptive term with a time of occurrence of the non-speech sound within the recorded audio to form a searchable tag, wherein the descriptive term includes a phonetic translation of the non-speech sound; and
program instructions to store the searchable tag as metadata of the recorded audio.

20. The system of claim 19, wherein the recorded audio is in a plurality of separate media streams received from a plurality of distinct electronic devices.

21. The system of claim 19, further comprising program instructions to receive an input from one or more of the plurality of participants to assist in tagging the non-speech sound.

22. A method for navigating to a location in recorded content, the method comprising the steps of:
- a computer receiving a descriptive term or phrase associated with a searchable tag, wherein the searchable tag corresponds to a point-in-time at which a non-speech sound occurred during the recording of recorded content of a communication between a plurality of participants, wherein the recorded content comprises speech from one or more of the plurality of participants, wherein the descriptive term includes an automatically generated phonetic translation of the non-speech sound, and wherein the non-speech sound was transmitted to the plurality of participants during the recording; and
- the computer navigating to a location in the recorded content corresponding to the point-in-time at which the non-speech sound occurred.

23. The method of claim 22, wherein the step of receiving a descriptive term or phrase associated with the searchable tag comprises the computer receiving a selection of a displayed term, wherein the displayed term provides a reference to the location corresponding to the point-in-time.

24. The method of claim 22, further comprising:
- prior to the step of navigating to the location, the computer identifying the searchable tag and the point-in-time.

25. The method of claim 22, wherein the step of receiving a descriptive term or phrase associated with the searchable tag comprises:
- the computer receiving a search query including the descriptive term or phrase; and
- the computer searching the recorded content for a match between the descriptive term or phrase and a term or phrase included in the searchable tag.

* * * * *